United States Patent
Iwata et al.

(10) Patent No.: US 6,873,073 B2
(45) Date of Patent: Mar. 29, 2005

(54) MAGNETO ROTOR

(75) Inventors: Masao Iwata, Yokosuka (JP);
Kiyoshige Enomoto, Yokosuka (JP);
Yoshiki Kitamura, Yokosuka (JP);
Shigeyuki Suzuki, Yokosuka (JP)

(73) Assignee: Oppama Industry Co., Ltd.,
Kanagawa-ken (JP)

( * ) Notice: Subject to any disclaimer, the term of this patent is extended or adjusted under 35 U.S.C. 154(b) by 116 days.

(21) Appl. No.: 10/178,244

(22) Filed: Jun. 25, 2002

(65) Prior Publication Data

US 2003/0011263 A1 Jan. 16, 2003

(30) Foreign Application Priority Data

Jul. 16, 2001 (JP) .................................... 2001-215369

(51) Int. Cl.$^7$ ............................. H02K 1/27; H02K 7/04
(52) U.S. Cl. ................ 310/70 R; 310/153; 310/156.08; 310/156.55
(58) Field of Search .................... 310/70 R, 153, 310/156.08, 156.55; 29/598; 123/406

(56) References Cited

U.S. PATENT DOCUMENTS

| | | | | |
|---|---|---|---|---|
| 2,060,259 A | * | 11/1936 | Spengler ................ 310/156.61 |
| 2,756,356 A | * | 7/1956 | Brownlee et al. ............ 310/153 |
| 3,581,394 A | * | 6/1971 | Phelon ................... 310/156.31 |
| 3,828,426 A | * | 8/1974 | Phelon et al. ................. 29/598 |
| 3,885,177 A | * | 5/1975 | Phelon et al. ............... 310/153 |
| 4,550,697 A | * | 11/1985 | Campen ................. 123/149 D |
| 4,710,659 A | * | 12/1987 | Takano et al. .............. 310/153 |
| 4,980,592 A | * | 12/1990 | Olmr et al. ................. 310/153 |
| 5,811,908 A | * | 9/1998 | Iwata et al. ................. 310/261 |
| 5,903,079 A | * | 5/1999 | Iwata et al. ............ 310/156.19 |

\* cited by examiner

*Primary Examiner*—Darren Schuberg
*Assistant Examiner*—David W. Scheuermann
(74) *Attorney, Agent, or Firm*—Michael D. Bednarek; Shaw Pittman LLP

(57) ABSTRACT

A rotor core, rotating in the vicinity of a generating coil, comprises a balance weight section and a pair of magnetic poles, provided on opposite sides of the balance weight section 2 with respect to a center of rotation O of the rotor core 1 to sandwich a magnet, and confronting through a magnetic gap G. A magnet holding section 9 for preventing the magnet 5 flying out through the magnetic gap G due to centrifugal force, is provided integrally contiguous to each of the magnetic poles so as to connect between the two magnetic poles.

6 Claims, 2 Drawing Sheets

MAGNETO ROTOR

BACKGROUND OF THE INVENTION

1. Technical Field

The present invention relates to a magneto rotor used in generation of ignition timing pulses, provided in a magneto of an internal combustion engine ignition device etc.

2. Related Art

A magneto rotor of the related art is shown, for example, in FIG. 3 and FIG. 4. The rotor has a balance weight section 20 and a pair of magnetic poles 30 and 40 integrally formed with a rotor core 10 for rotating in the vicinity of a generating coil, not shown. The pair of magnetic cores 30, 40 are provided on a side opposite the balance weight section 20 with respect to a center of rotation O of the rotor core 10.

A magnetic steel magnet 50 is fitted between the magnetic poles 30 and 40 such that both sides are inserted into slots 30a and 40a formed in opposite surfaces of the magnetic poles 30 and 40. A magnetic gap G for exerting a magnetic field focused on the generating coils is then provided at an outer side of the magnet 50, between the magnetic cores 30 and 40.

Also, the rotor core 10 is molded together with the magnet 50 inside a rotating disk 60 formed of a nonmagnetic member such as synthetic resin, for example, and tips of the magnetic poles 30 and 40 protrude outward slightly from the peripheral surface of the rotating disc 60. Reference numeral 70 is a shaft hole into which a crankshaft of the internal combustion engine is inserted.

In the magneto rotor, magnetic flux generated by the magnet 50 is generated as a sharp pattern magnetic field from the magnetic gap G between tips of the magnetic cores 30 and 40. This magnetic field repeatedly passes through the vicinity of the generating coil with rotation of the rotor core 10. Because of this, a voltage corresponding to the strength of the magnetic field is induced in the generating coil, and it is possible to cause discharge of ignition current from the condenser charged with this voltage into the ignition coil at a fixed timing. As a result, the internal combustion engine is started and driven.

However, with the rotor of the related art, the magnet 70 is subjected to centrifugal force at the time of high speed rotation of the rotor core 10 and generates force so as to fly outwards, this force acts to force open the magnetic gap G and finally there is a danger of deformation and damage to the magnetic poles 30 and 40 themselves and damage to the rotating disc 60.

On the other hand, in order to prevent the magnet 50 flying outwards in this way, a method of binding the magnetic poles 30 and 40 holding the magnet 50 with a band has been considered, but since it is necessary to connect the ends of the band each other with a separate piece, as well as there being a large cost increase there is a problem that the external dimensions of the connecting section of the band ends are increased posing an obstacle to miniaturization of the rotor.

SUMMARY OF THE INVENTION

The present invention is for solving the above described problems, and an object of the present invention is to provide a magneto rotor that can effectively prevent a magnet flying outwards during high speed rotation without using a separate piece and with a low-cost structure.

In order to achieve this object, a magneto rotor according to the present invention has a rotor core, rotating close to a generating coil, that is provided with a balance weight section and a pair of magnetic poles being provided on a side the balance weight section with respect to a center of rotation of the rotor core so as to sandwich a magnet, and confronting each other through a magnetic gap, and a magnetic holding section for preventing the magnet from flying out through the magnetic gap due to centrifugal force is provided integrally continuous to each of the magnetic poles so as to connect between the two magnetic poles. In this way, it is possible to cause a strongly pointed magnetic field to be generate from the magnetic gap, and to prevent deformation and damage of the magnetic poles using the magnet holding section, and it also possible to prevent deformation and damage to a rotating disc enveloping the magnet holding section.

As a preferred embodiment, it is also possible to make the magnet holding section in a bridge shape so as to magnetically short-circuit a part of the magnetic gap. In doing this, it is possible to effectively prevent the magnet flying out from between the magnetic poles during rotation of the rotor core using the bridge shaped magnet holding section, and it is also possible to cause generation of a required strong magnetic field from the magnetic gap.

PREFERRED EMBODIMENT OF THE INVENTION

Figure 1:
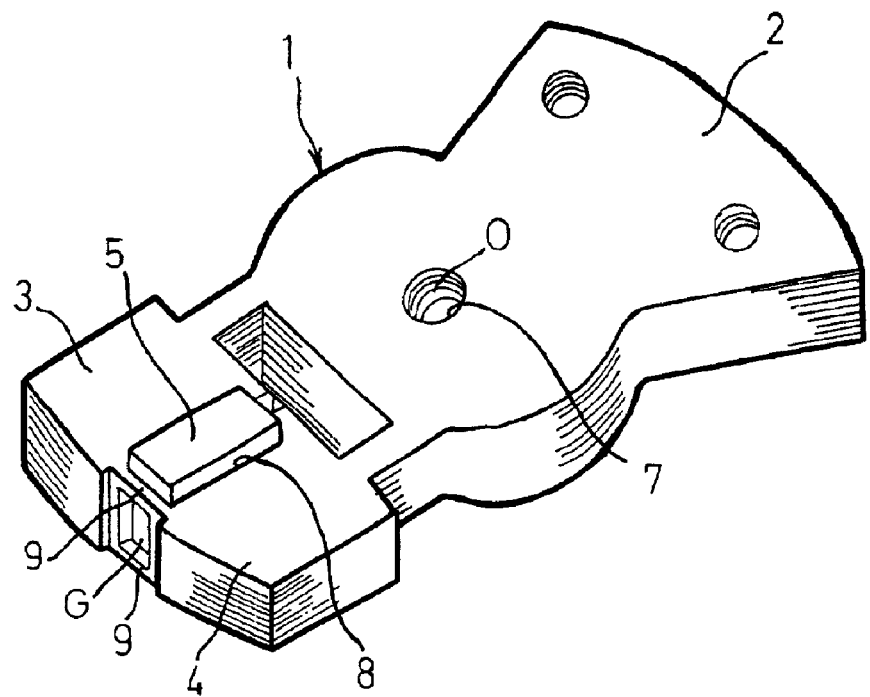
FIG. 1 is a perspective view of essential parts of a magneto rotor according to one embodiment of the present invention.
Figure 3:
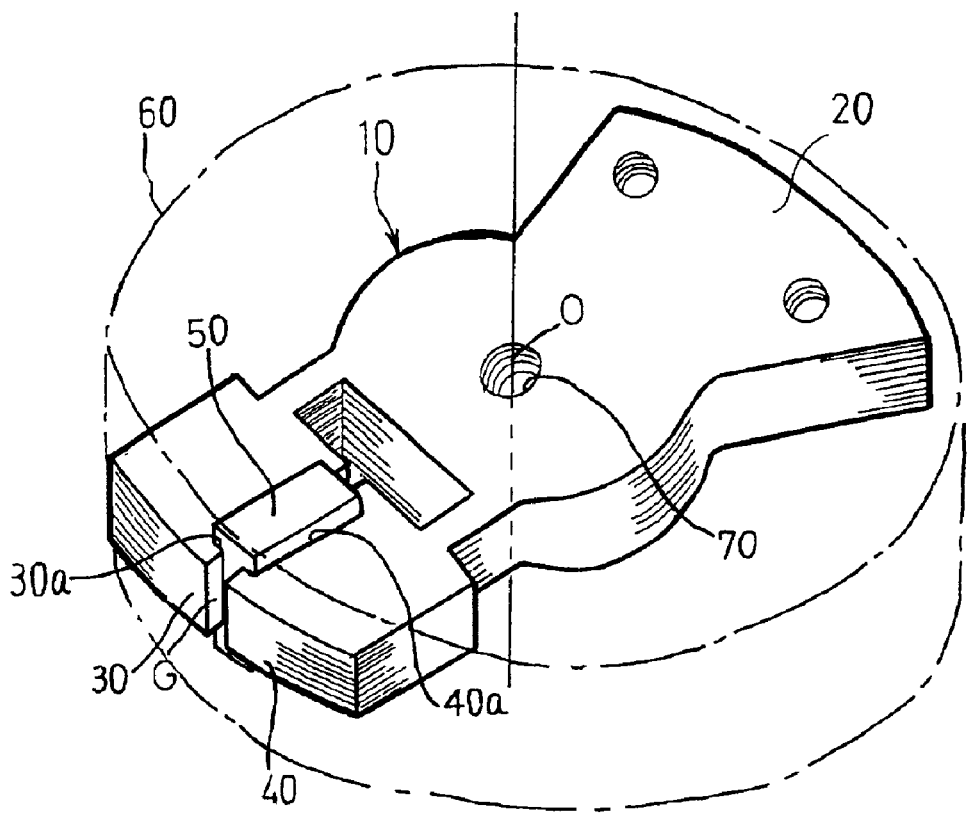
FIG. 3 is a perspective view of essential parts showing a magneto rotor of the related art.
Figure 4:
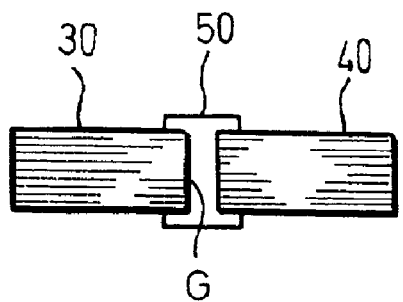
FIG. 4 is a front elevation of the magneto rotor shown in FIG. 3.

A magneto rotor (magneto electric generator rotor) according to one embodiment of the present invention shown in FIG. 1 has a balance weight section 2 and a pair of magnetic poles 3, 4 integrally formed on a rotor core 1 rotating in the vicinity of a generating coil (not shown in the drawing). Here, the magnetic poles 3, 4 are provided on a side opposite the balance weight section 2 with respect to a center of rotation O of the rotor core 1. A shaft hole 7, into which a crankshaft of an internal combustion engine is inserted, is formed in a central part of the rotor core 1. Although omitted from the drawings, the rotor core 1, similarly to the related art of FIG. 3, is molded inside a rotating disc formed from a non-magnetic member such as a synthetic resin, for example, with tip sections of the magnetic poles 3 and 4 projecting slightly outwards.

A magnet 5 is held between the magnetic poles 3 and 4 so as to be fitted inside a notch 8 formed in opposite surfaces of the poles 3 and 4. A magnetic gap G, for exerting magnetic flux that has been focused on the generating coil, is provided in an outer end of the magnet 5, between the magnetic poles 3 and 4.

Figure 2:
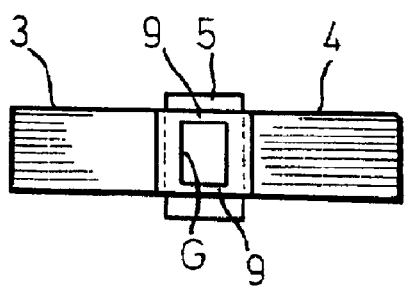
FIG. 2 is a front elevation of the magneto rotor shown in FIG. 1.

As shown in FIG. 2, this magnetic gap G is magnetically and mechanically short-circuited by a magnet holding section 9. The magnet holding section 9 is provided at upper and lower tip sections of the magnetic poles 3 and 4, and extends so as to integrally join the two magnetic poles 3 and 4. That is, the magnet holding section 9 links the magnetic poles 3 and 4 into a bridge shape at a tip end of the magnet 5 except for the magnetic gap G, and in this way reliably regulates movement of the magnet 5 towards the outer edge. Deformation of the magnetic poles 3 and 4 is also prevented by the magnet holding section 9.

The core thickness of the magnetic gap G, and the magnetic gap width and gap depth are set to a size enabling extremely efficient voltage output from the generating coil using a magnetic field focused by the magnetic gap G. As shown in FIG. 2, the magnetic gap G forms a rectangular hole shape when viewed from the front, and a strong magnetic field is generated through this rectangular hole-shaped magnetic gap G.

The thickness, and length and width of the magnet holding section 9 are set to suitable dimensions so as to satisfy the following two conditions. Specifically, firstly the magnet holding section 9 should attain a sufficiently strong connection between the magnetic poles 3 and 4 to prevent deformation and damage to the magnetic poles 3 and 4, even if a force that moves the magnet 5 in the radial outward direction of the rotating surface of the rotor core 1 acts due to centrifugal force as a result of rotation of the rotor core 1. Secondly, the size of the magnetic gap G should be sufficient to ensure that a suitably strong magnetic field is obtained.

Similarly to the rotor core of the related art, the rotor core 1 can be manufactured by punching and laminating steel plates, which means that manufacture is simple and cost is cheap.

What is claimed is:

1. A magneto rotor having a rotor core rotating on an internal combustion engine in the vicinity of a generating coil, the rotor core comprising a balance weight section and a pair of magnetic poles provided on a side opposite the balance weight section with respect to a center of rotation of the rotor core so as to sandwich a magnet, the pair of magnetic poles confronting each other through a magnetic gap, wherein a magnet holding section, formed in a bridge shape between the magnetic poles and for preventing the magnet from flying out through the magnetic gap due to centrifugal force, is provided integrally continuous to each of the magnetic poles so as to connect the two magnetic poles, and wherein the bridge shaped magnet holding section extends circumferentially to the rotating plane of the rotor core.

2. The magneto rotor according to claim 1, wherein the bridge shaped magnet holding section magnetically short-circuits a part of the magnetic gap.

3. The magneto rotor according to claim 1, wherein the rotor core is made of laminated steel plates.

4. The magneto rotor according to claim 1, wherein the magnetic holding section is provided at upper and lower tip sections of the two magnetic poles.

5. The magneto rotor according to claim 4, wherein the magnetic gap forms a rectangular hole shape when viewed from a front perspective.

6. The magneto rotor according to claim 4, wherein the size of the magnetic gap is sufficient to obtain a strong magnetic field through the magnetic gap.

* * * * *